July 14, 1970 P. R. KELLY 3,520,295

CARDIAC R-WAVE DETECTOR WITH AUTOMATIC GAIN CONTROL

Filed March 6, 1968

Inventor
Paul R. Kelly
By Ralph G. Hohenfeldt
Attorney

United States Patent Office 3,520,295
Patented July 14, 1970

3,520,295
CARDIAC R-WAVE DETECTOR WITH AUTOMATIC GAIN CONTROL

Paul R. Kelly, Hales Corners, Wis., assignor to General Electric Company, a corporation of New York Filed Mar. 6, 1968, Ser. No. 710,910
Int. Cl. A61b 5/04
U.S. Cl. 128—2.06 3 Claims

ABSTRACT OF THE DISCLOSURE

Negative or positive going electrocardiac wave forms within a wide amplitude range are caused to produce output pulses that are coincident with the R-wave peaks of the wave forms. This enables indicating heart rate and also carrying out certain cardiac diagnostic procedures using occurrence of the R-wave as a time reference point. The input wave form voltage complexes are all made positive by rectification. They are passed through a gain control stage and to a filter whose band pass is about ten hertz, the largest frequency component of the R-wave. The waves are fed to a transistor whose gain is controlled with a field effect transistor in its emitter circuit. The pulse voltage from an output stage transistor is fed back to control the impedance of the field effect transistor and, hence, the gain of the controlled transistor. Thus, only R-wave peaks are detected and they produce output pulses of a predetermined amplitude regardless of their initial amplitude or polarity.

BACKGROUND OF THE INVENTION

Equipment used for monitoring cardiac patients during diagnosis and treatment usually requires some means for detecting the R-wave or QRS complex as distinguished from the remainder of the electrocardiographic wave form. The R-wave peak, which has the largest amplitude of any part of the wave form, is used to produce a heart rate indication and as a time reference point for initiating certain medical diagnostic and treatment procedures. For example, in connection with heart catheterization, the cardiologist may want to inject radiopaque dye into the heart cavity or blood vessels and energize an X-ray source at a precise moment with respect to occurrence of the R-wave. If a patient is in atrial fibrillation, it may be necessary to synchronize operation of a defibrillator with the R-wave. In this case, the atrium must be stopped completely by a defibrillator pulse, but the pulse should not coincide with the QRS complex nor with the T-waves of the cardiograph cycle or ventricular fibrillation may result.

Methods such as level detecting and filtering have been used in the past for detecting the R-wave. These methods have not been fully satisfactory because any moderate change in the R-wave amplitude, the range of 2 or 3:1, results in the amplitude falling below the threshold level of the instrument, in which case the latter fails to indicate as it should. Sometimes variations in the electric vectors across the patient's body caused by the heart shifting as a result of the patient turning over, bring about potential changes in the electrocardiograph signal which result in missed R-wave complexes even though the heart is in fact functioning normally. To account for these variations in the input, prior art devices have been provided with a manually settable gain control potentiometer so that the threshold level could be set for the conditions existing at the time of setting. The gain control often had to be reset when the patient merely moved.

Generally, the healthy heart will produce R-waves that have polarity with standard display as a positive going QRS wave form. A damaged heart, on the other hand, produces opposite going R-waves occasionally in some cases and consistently in others. Prior art R-wave detectors have been handicapepd in an inability to respond to these polarity changes, and those that do respond, often exhibit a significant difference between the output pulse and the actual QRS peak for the opposite polarity input pulse. The difference in time delay between opposite polarity pulses makes it difficult to use a synchronizing device. In fact, any time delay between the output pulse and the QRS peak time reference will cause an error if used for synchronization. Since heart monitors are usually provided with means for producing an alarm signal when output pulses are irregular, the missing of beats by the detector causes false alarms with consequences that are too evident to require discussion.

SUMMARY OF THE INVENTION

The present invention overcomes the above-noted problems. In general terms, the invention involves amplifying the ECG waves and passing them through a rectifier which produces positive output pulses regardless of whether the input waves are positive or negative. The rectified pulses are fed to an active band pass filter through a gain control stage. The filter is designed to eliminate noise frequencies that are due to muscle potentials, changes in impedance incidental to movement by the patient and to ambient 60 hertz interference. The filter band pass frequencies centers about 10 hertz which is the dominant frequeny of the QRS complex.

The filter output wave forms have the same periodicity as the heart rate at either normal or abnormal rates and these wave forms are fed into an amplifying stage which controls an output stage transistor. The output transistor produces differentiated positive output pulses which may be used to operate an integrating heart ratemeter or they may be used to operate other diagnostic or treatment equipment synchronously with the R-waves. The amplifying transistor has a field effect transistor in its emitter circuit. The output pulse level is fed back to vary the impedance of the field effect transistor and, hence, the gain of the amplifying transistor. In this way, the amplifying transistor is caused to track to any level and amplify only the peaks of the R-waves, excluding all other signal components. A time reference point is thereby established which is always at the peak and near the center of the QRS complex.

It is evident from the foregoing that it is among the objects of this invention to provide an R-wave detector which has automatic gain control to eliminate the need for making manual adjustments to compensate for different input signal levels.

Another object of the invention is to provide an R-wave detector that produces an output signal for negative as well as positive going cardiac input signals without any delay occurring between input and output signals.

A further object is to provide a detector that yields a true indication of heart beat rate and produces a stable time reference point for carrying on other procedures in connection with diagnosis and treatment of a cardiac patient.

How the foregoing and other more specific objects are achieved will appear from time-to-time throughout the course of the ensuing detailed description of the invention which will now be set forth in reference to the drawing.

DESCRIPTION OF THE PREFERRED EMBODIMENT

Figure 1:
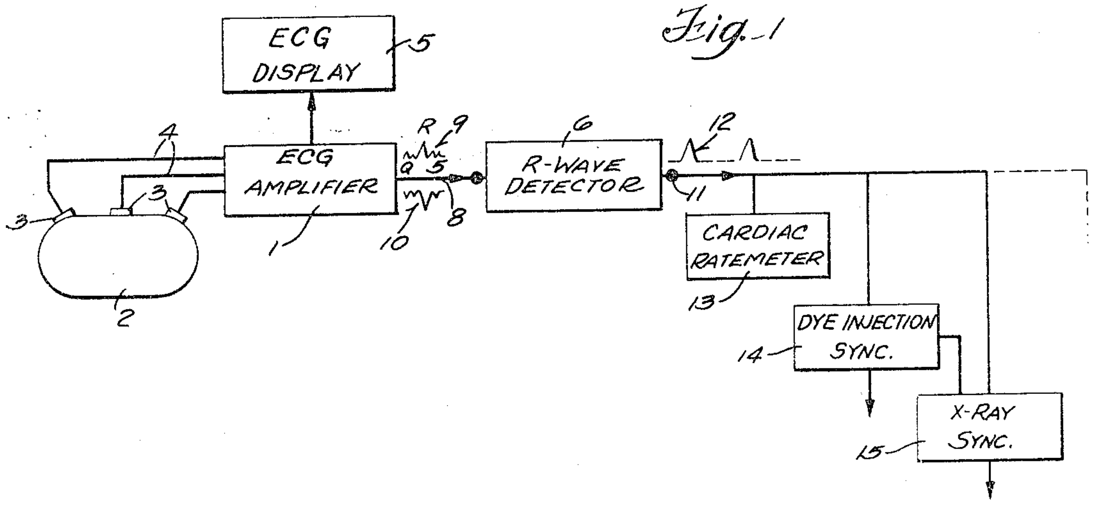
FIG. 1 is a block diagram of a typical cardiac monitoring system in which the new R-wave detector may be used; and, FIG. 2 is a schematic diagram of the electric circuitry of an embodiment of the invention.

In FIG. 1 an electrocardiograph amplifier 1 is connected to pick up cardiac waves from a subject 2 by means of body contacting electrodes 3 and three standard leads 4. The amplified cardiac wave forms may be fed from ECG amplifier 1 to any desired ECG display device 5 which may be an electrocardiogram recorder or an oscilloscope, for example. Another output from amplifier 1 is fed to the R-wave detector 6 by way of an input terminal 7 and a conductor 8. Typical cardiac wave forms that are supplied to input terminal 7 are represented by the positive going form 9 and the negative going form 10 adjacent conductor 8. As explained earlier, the cardiac waves are usually positive when the heart is normal, but they may go negative occasionally or consistently in some cases.

The details of the new R-wave detector 6 will be described later. For the moment it is sufficient to observe that detector 6 produces on its output terminal 11 recurring differentiated pulses 12 which have a periodicity coinciding with the beating rate of the heart at the time. The output pulses 12 may be fed to various utilization devices. For example, the pulses may be used to drive a conventional cardiac ratemeter 13 for the purpose of displaying heart rate. The pulses may also be used to operate a radiopaque dye injection synchronizing device 14 which may be adjusted by the cardiologist to inject dye into the heart cavities or blood vessels at a precise moment with respect to occurrence of an R-wave peak. Similarly, the R-wave peaks may be used to turn on an X-ray machine by means of an X-ray synchronizing device 15.

Figure 2:
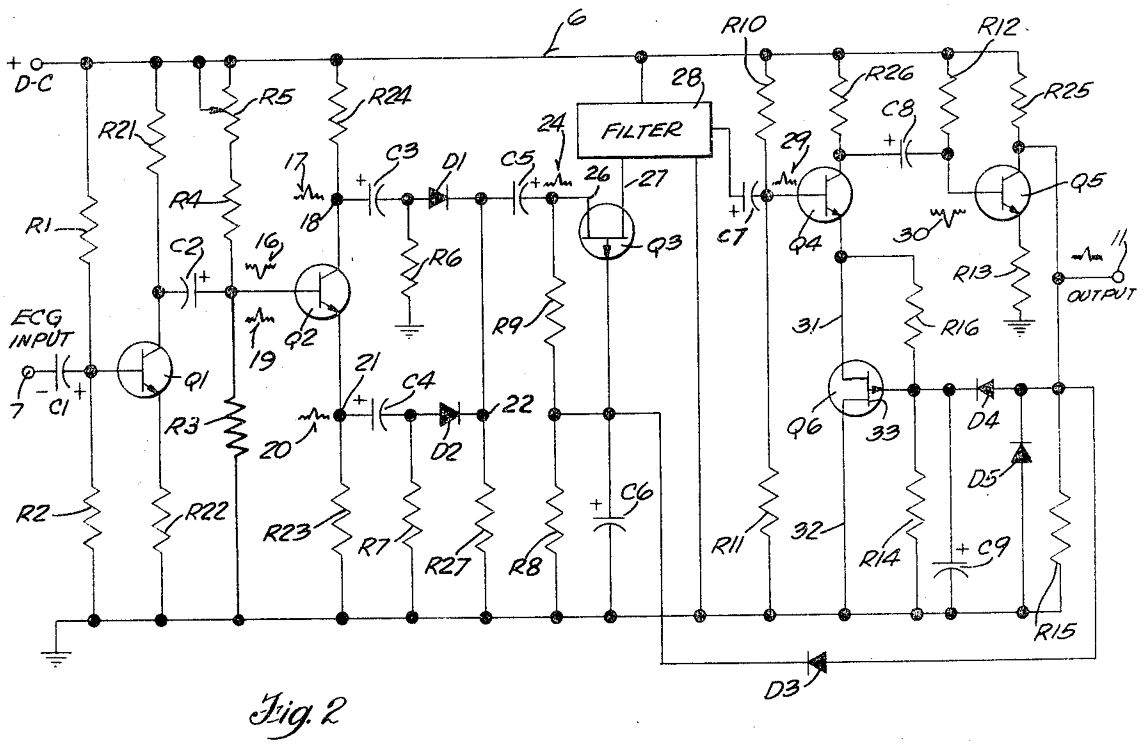

Refer now to FIG. 2 for a more detailed description of the new R-wave detector. The preamplified cardiac waves are fed from ECG amplifier 1 to input terminal 7 of the R-wave detector. At this point, the cardiac waves may be positive or negative and have amplitudes ranging from 15 millivolts to 2 volts above a base line. The input waves are fed through a capacitor C1 to the base of an amplifying transistor Q1. The operating point Q1 is established by the voltage divider comprising resistors R1 and R2. Q1 has a collector resistor R21 and a stabilizing resistor R22 in its emitter circuit. The amplified voltages from the collector of Q1 are fed through a coupling capacitor C2 to the base of transistor Q2. The biasing circuit for this transistor comprises resistors R3 and R4 together with a bias adjust potentiometer R5. Q2 has a collector resistor R24 and an emitter resistor R23. In accordance with well-known characteristics of transistor Q2, a negative going R-wave 16 is inverted and produces a positive going wave 17 at the collector terminal 18. A positive going input wave form 19, produces on the other hand, a positive going wave form 20 at emitter terminal 21. Thus, it is seen that a negative input wave 16 will make collecter terminal 18 positive in which case diode D1 will conduct. A positive going input wave 19 will make emitter terminal 21 positive in which case diode D2 will conduct. In either case, the positive voltage will appear at the top terminal 22 of a resistor R27. When diodes D1 and D2 conduct, capacitors C3 and C4 charge as shown. Associated with the capacitors are discharge resistors R6 and R7. Potentiometer R5 is used to adjust the bias on Q2 so that the positive output wave forms at points 18 and 21 will be balanced and of substantially equal amplitude.

It is evident from the foregoing that either positive or negative input pulses to transistor Q2 result in a series of corresponding pulses which are only positive as they appear at point 22. These positive pulses are applied through a coupling capacitor C5 to the source terminal 26 of a P-channel field effect transistor Q3 when they appear as indicated by the wave form 24. The drain of Q3 is connected to and acts as the input to a filter circuit 28.

Field effect transistor Q2 is used as an impedance varying device for controlling the input signals to the filter 28 within a predetermined narrow range. The reason for this is to avoid distortion and reduction of frequency selectivity by the filter when input voltage variations are too great. Transistor Q3 has an RC combination in its gate circuit comprising capacitor C6 and resistor R8. Positive going output signals from the output terminal 11 of the R-wave detector are fed back through a diode D3 to charge the top plate of capacitor C6 positively in this example. The voltage level on capacitor C6 affects the voltage on the gate terminal of transistor Q3. As the gate becomes more positive, the impedance of Q3 increases and its conductivity decreases. Conversely, as the gate terminal of Q3 becomes more negative the transistor becomes more conductive and has lower impedance. Thus, the level of the input pulses to filter 28 is made essentially constant by changing gain of transistor Q3 in response to the level of the signals from the output terminal 11 of the R-wave detector. Between output pulses, capacitor C6 begins discharging through resistor R8. The next succeeding pulse restores the voltage on capacitor C6 to the proper level. Also provided is a resistor R9 for preventing the gate terminal of field effect transistor Q3 from floating.

As explained earlier, the dominant frequency component of the R-wave is 10 hertz so filter 28 is centered about that frequency. The filter suppresses ambient 60 hertz hum and other frequencies that might be caused by muscle potentials and with changing electric vectors when the patient moves. Filter 28 may take a variety of forms. In a practical embodiment, an active band pass parallel T-type of filter is used. Filters of this type are known to those versed in the electronic art and require no further discussion.

The positive output pulses from filter 28 are supplied to the base of transistor Q4 through a coupling capacitor C7. By means of a biasing network comprising resistors R10 and R11, transistor Q4 is biased to near cut-off. Positive R-wave pulses such as 29, which are supplied to the base of transistor Q4, are amplified and inverted to negative pulses as they appear on the collector resistor R26 of the transistor. The negative pulses are transmitted through capacitor C8 to the base of a transistor Q5 which is biased in saturation by resistor R12 and emitter resistor R13. The negative pulses 30 on the base of Q5, result in positive going differentiated pulses appearing on the collector of Q5 and on output terminal 11 which may be connected to any utilization device.

An important feature of the new R-wave detector is that it responds to and amplifies only the peaks of the incoming R-waves. This is accomplished by using a field effect transistor Q6 as an automatic gain control device for Q4. The field effect transistor Q6 effectively increases its impedance from source 31 to drain 32 with increasing positive voltage on its gate 33. Thus, if an R-wave pulse 29 on the base of Q4 is followed by an R-wave pulse of a lesser amplitude, a positive output pulse of lower amplitude will appear on the collector of Q5 which is in the next stage and operating in saturation. If the R-wave amplitude is greater than a preceding one, the output pulse on the collector of Q5 will, of course, increase. In either case, a pair of diodes D4 and D5 act as a peak detector and cause a capacitor C9 to charge to a higher positive voltage if the collector of Q5 goes more positive and to a decreased positive value if the collector of Q5 goes less positive. This results in increasing and decreasing, respectively, the impedance between the drain 32 and source 31 of Q6. The impedance variations hold the gain of transistor Q4 at a predetermined level. Between output pulses, capacitor C9 discharges to a new level through resistor R14 which has an appropriate time constant in conjunction with C9. As a result of this gain control arrangement, the amplified R-wave peaks appearing on output terminal 11 remain at an essentially constant level regardless of the amplitude or polarity of the cardiac waves applied to the input terminal 7 of the R-wave detector. Resistor R15 and diode D5 conduct any negative going components in the output pulse to ground. Resistor R16 serves to establish a definite voltage on the gate of field effect transistor Q6 and prevents it from floating.

In FIG. 2, field effect transistors Q3 and Q6 are P-channel type JFET(U112). Transistor Q4 is a type 2N3417. Transistors Q1, Q2, and Q5 are type 2N3416. Identifying the values of the other components is deemed unnecessary because it is within the purview of a skilled designer to establish the proper biasing voltages and time constants with the aid of the transistor characteristic curves and the functional description given above.

In summary, there has been described a new R-wave detector which amplifies only the peaks of the incoming R-waves and produces constant amplitude output pulses without time delay regardless of the polarity and amplitude of the incoming cardiac waves. The effects of cardiac vector changes are negated. A manual gain control potentiometer requiring attention by the operator is no longer needed. False alarms are substantially eliminated.

Although a preferred embodiment of the invention has been described in considerable detail, such description is to be considered illustrative rather than limiting, for the invention may be variously embodied and is to be limited only by interpretation of the claims which follow.

I claim:

1. A cardiac R-wave detector comprising:

(a) a rectifier means having an input terminal receiving either positive or negative polarity R-wave signals and an output terminal on which corresponding rectified signals are produced, (b) a transistor amplifier having an input terminal receiving the rectifier R-wave signals and an output terminal on which amplified rectified R-wave signals are produced, (c) another transistor having an input terminal receiving the amplifier R-wave signals and having an output terminal, (d) a field effect transistor having its source and drain in a circuit with said transistor amplifier and having a gate that responds to variations in applied voltage by varying the impedance between source and drain to thereby control the gain of said amplifier, (e) a resistor and capacitor connected in parallel and having one common point connected to said gate, (f) diode means connecting said output terminal of the other transistor to said common point to thereby control the voltage on the gate and the gain of the amplifier at a level that results in R-wave peaks only being detected.

2. The invention set forth in claim 1 including:

(a) a filter having a band pass centered about ten hertz, said filter being connected between said rectifier output terminal and the input terminal of said transistor amplifier.

3. The invention set forth in claim 2 including:

(a) a field effect transistor having source and drain electrodes which are in a series circuit between said rectifier output and the input to said filter and having a gate electrode, (b) a resistor and a capacitor connected in parallel with one of their common connections being connected to said last-mentioned gate electrode, (c) diode means connecting the output terminal of the R-wave detector to the said one common connection and said gate electrode whereby to control the voltage on the capacitor and the gate electrode and thereby control the impedance between the source and drain for automatically controlling the input signal amplitude to the filter.

References Cited

UNITED STATES PATENTS

| | | | |
|---|---|---|---|
| 3,129,704 | 4/1964 | Burt | 128—2.06 XR |
| 3,174,478 | 3/1965 | Kahn | 128—2.06 |
| 3,222,610 | 12/1965 | Evans et al. | 307—251 XR |
| 3,443,122 | 5/1969 | Bowers | 307—251 XR |

WILLIAM E. KAMM, Primary Examiner